United States Patent [19]

Frank

[11] Patent Number: 4,657,241

[45] Date of Patent: Apr. 14, 1987

[54] DISTRIBUTION LINE FOR FLAT OBJECTS AND PARTICULARLY FOR LETTERS

[75] Inventor: Werner Frank, Reichenau, Fed. Rep. of Germany

[73] Assignee: Licentia Patent-Verwaltungs-GmbH, Frankfurt, Fed. Rep. of Germany

[21] Appl. No.: 692,881

[22] PCT Filed: May 15, 1984

[86] PCT No.: PCT/EP84/00145

§ 371 Date: Jan. 15, 1985

§ 102(e) Date: Jan. 15, 1985

[87] PCT Pub. No.: WO84/04518

PCT Pub. Date: Nov. 22, 1984

[30] Foreign Application Priority Data

May 17, 1983 [DE] Fed. Rep. of Germany ....... 3317865

[51] Int. Cl.$^4$ .................... B65H 29/40; B65H 29/70
[52] U.S. Cl. .................... 271/305; 271/179; 271/188; 271/209
[58] Field of Search .............. 271/179, 188, 305, 209

[56] References Cited

U.S. PATENT DOCUMENTS 3,078,089 2/1963 Maidment ........................ 271/179
3,131,932 5/1964 Maidment .
3,628,788 12/1971 Simmons ...................... 271/179 X
3,865,365 2/1975 Hardin et al. .
4,345,754 8/1982 Willenbring ...................... 271/209
4,518,160 5/1985 Lambrechts ................... 271/179 X

FOREIGN PATENT DOCUMENTS 0049718 4/1982 European Pat. Off. .
1253170 10/1967 Fed. Rep. of Germany .
516463 1/1972 Switzerland .

OTHER PUBLICATIONS

Principles and Applications of Waveguide Transmission, p. 207 Southworth, D. Van Nostrand Co Inc, Jun. 1954.

Primary Examiner—Richard A. Schacher
Attorney, Agent, or Firm—Spencer & Frank

[57] ABSTRACT

A device for use in conjunction with a compartmented distribution line for flat articles, such as letters, which arrive in succession over a conveying path. The device comprises a succession of stacking compartments arranged one behind the other to which the flat articles are supplied by switches separately associated with the individual compartments. On the conveying path, closely before each individual stacking compartment, there is provided a rubber elastic roller-type attachment which faces the upper edge of each flat article against a guide sheet disposed opposite the attachment.

8 Claims, 4 Drawing Figures

DISTRIBUTION LINE FOR FLAT OBJECTS AND PARTICULARLY FOR LETTERS

BACKGROUND OF THE INVENTION

The invention relates to a compartmented distribution line. In automatic mail distribution systems, a compartmented distribution line serves, for example, to roughly distribute according to postal guide code regions letters arriving successively on a conveyor belt and therefore, as shown in FIG. 1, such a line is composed of a plurality of stacking compartments assigned separately to these regions and arranged one behind the other.

By means of a compartmented path equipped with switches, the pieces of mail are associated with the individual stacking compartments and stacked therein. At the input of this compartmented path, there is a measuring path on which it is determined whether the respective piece of mail is "too long" or the gap between successive pieces of mail is too small. The gap must not be below a certain value since otherwise the switch does not have sufficient time to open or close during the gap.

Mail that cannot be processed or has too small a gap between pieces is stacked in a reject compartment.

It is the object of the invention to align, in such a compartmented distribution line, the leading edges of pieces of mail to be stacked as accurately as possible with one another, to avoid their being folded over and not to stack them with bent-over corners because otherwise this could produce malfunctions during stacking in the respective stack compartment because the stacking triangle would be closed more and more.

This state occurs primarily if pieces of mail which are not very stiff or unstable and bulk mailings are stacked.

When stacking occurs with a minimal gap between pieces of mail, the trailing edge of the preceding piece has not yet left the insertion region so that the next following piece runs onto the trailing edge. The result is that a malfunction (clogging) occurs and the system stops. This means unnecessary down time of the system which is equivalent to less output or reduction in throughput.

It is thus significant for the invention that its use avoids the above-mentioned various causes of possible malfunctions and poor stack quality.

SUMMARY OF THE INVENTION

The present invention is for use in conjunction with a compartmented distribution line for flat articles, such as letters, which arrive in succession over a conveying path. The device comprises a succession of stacking compartments arranged one behind the other to which the flat articles are supplied by switches separately associated with the individual compartments. On the conveying path, closely before each individual stacking compartment, there is provided a rubber elastic roller-type attachment which faces the upper edge of each flat article against a guide sheet disposed opposite the attachment.

The invention further comprises a stacking spindle of the type disclosed in German Pat. No. 1,253,170. This patent relates to a stacking devices for flat items to be conveyed, such as pieces of mail in particular, in which the pieces of mail arrive on the stack by way of a supplying device, their leading edges abut against a solid wall and they are stacked in a position perpendicular to this wall, with a stiffening curvature being imparted to the pieces of mail to be stacked.

The stiffening curvature is here effected in that the supplying device for the pieces of mail comprises a curved roller which imparts the stiffening curvature to the pieces of mail as they enter the device and which is disposed at a distance from the solid wall only slightly greater than the length of the pieces of mail.

The curved roller advantageously cooperates with a resilient counterroller having a complementary curvature.

DESCRIPTION OF THE PREFERRED EMBODIMENT

In FIGS. 1-4, 1 represents a stacking roller, 2 a stacking spindle, 3 a rimmed roller having an attachment 3a, 4 a guide sheet including a guide fence 4a, 5 an insertion sheets, 6 a stacking wall, 7 a stacking bottom, 8 a stack of mail wherein the individual pieces of mail are designated 8a, 9 an abutment, 10 and 11 conveyer belts, 12 a grooved ball bearing and 13 a base plate.

Figure 4:
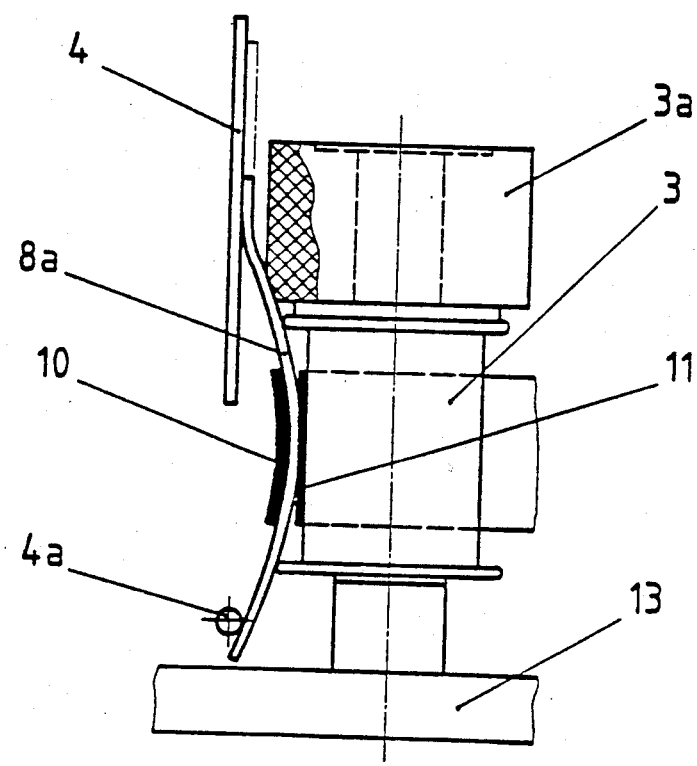
FIG. 4 is a sectional view of the stacking compartment of FIG. 2 taken along the line A—A. The figure shows how curvature is imparted to a piece of mail.

Each piece of mail is brought to rimmed roller 3 by cover belt 10, 11. The rimmed roller serves the purpose of imparting a curvature to the piece of mail (FIG. 4). The piece of mail thus becomes stable on its longitudinal axis.

It is the purpose of rubber elastic attachment 3a to place the upper region of the piece of mail against guide sheet 4 and to guide it therealong.

The piece of mail remains curved until its trailing edge is released by rimmed roller 3. The curvature is eliminated—the lower edge of the piece of mail moves in the direction of stacking spindle 2 and is taken over thereby and transported in ascending direction to stack 8 and insertion sheet 5. The stacking spindle is installed in the corresponding position. During this process, the lower edge of the piece of mail, but not its upper edge, is transported at the same speed out of the insertion region by the stacking spindle (FIG. 3).

Figure 1:
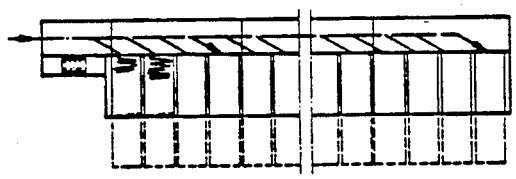
FIG. 1 is a schematic diagram showing a compartmented distribution line for a mail distribution system.
Figure 2:
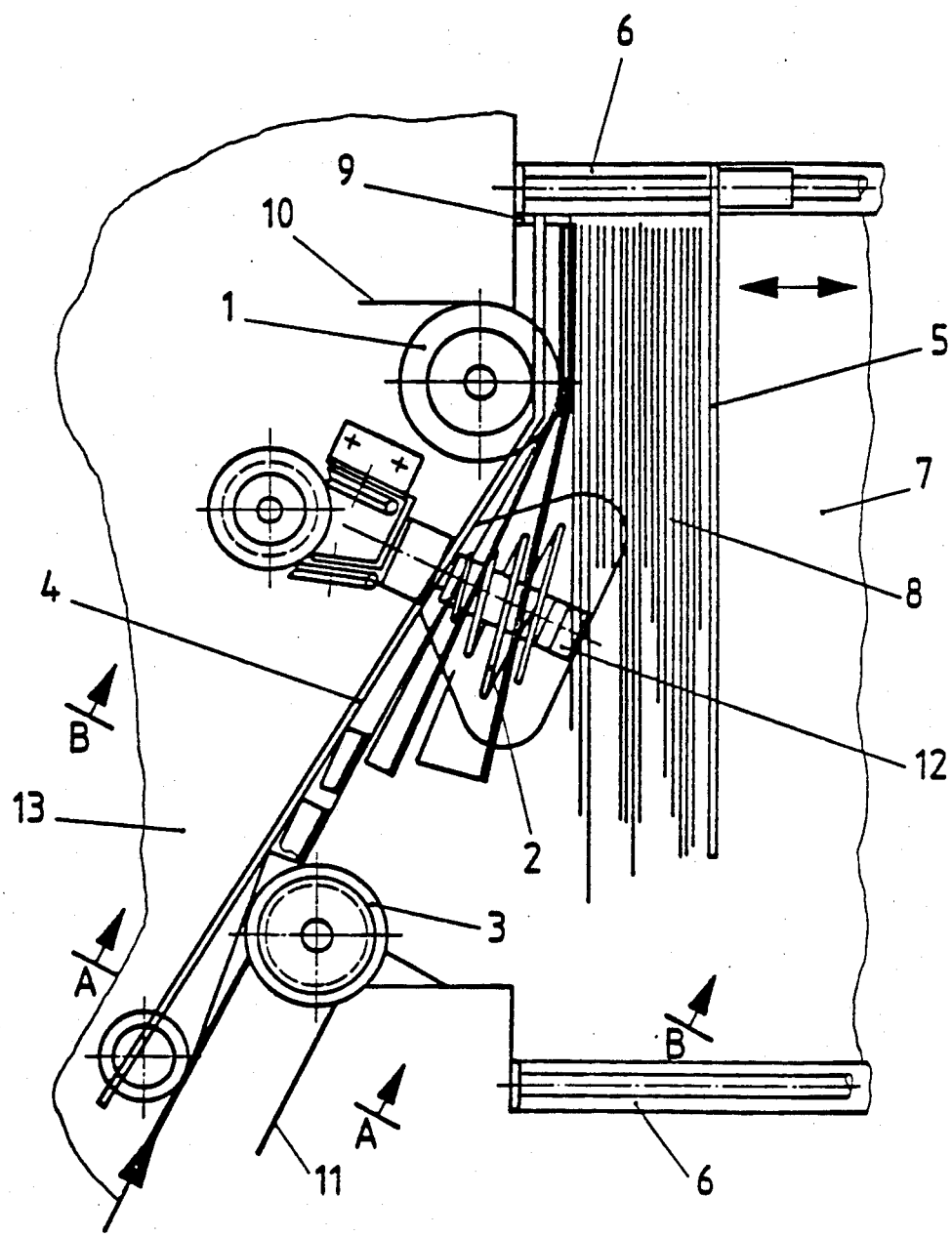
FIG. 2 is a top plan view of the present invention showing a stacking compartment.
Figure 3:
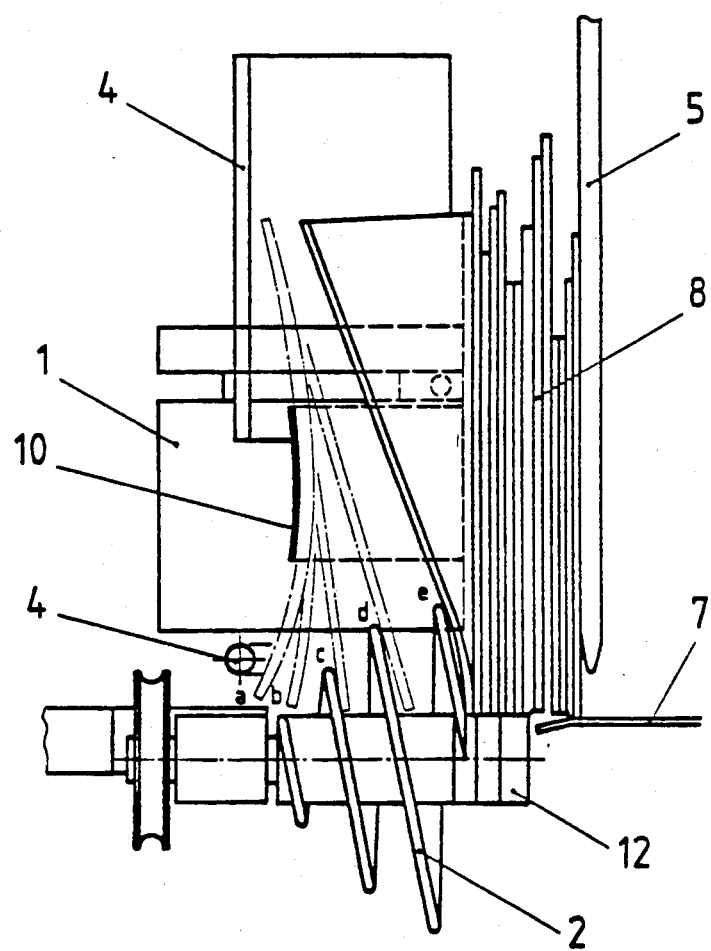
FIG. 3 is a sectional view of the stacking compartment of FIG. 2 taken along the line B—B. The figure shows the individual phases through which a piece of mail is carried during the stacking process.

In FIG. 3, the position of the mail upon entry is shown as phase a, transfer of the lower edge to the stacking spindle as phase b, transport within the stacking spindle as phases c and d, and placing the upper edge of a piece of mail against the stack of mail or against the insertion sheet 5 as phase e.

To prevent abutment on the trailing upper edge of the preceding and already stacked piece of mail, the upper edge of the next following piece of mail 8a is forced and guided against guide sheet 4 by attachment 3a (FIG. 4). Contact of the preceding trailing upper edge (corner) with the subsequent leading upper edge (corner) is impossible. This solution makes it possible to stack a succession of pieces of mail with the shortest possible gaps therebetween.

The conical shape of stacking spindle 2 supports the stack 8 of mail. Caused by the discharge of the spindle helix, a shaking effect is produced at the end of the spindle with the result that the stack of mail is loosened in the region of the stacking roller 1 (stack pressure is reduced since stack pressure increases with increasing stack length). The friction (stack pressure) between pieces of mail and stacking roller 1 is no longer very high so that the incoming piece of mail is securely pulled through or inserted, respectively, up to abutment 9.

What is claimed is:

1. In a compartmented distribution line for flat articles, such as letters, arriving in succession over a conveying path, a device comprising a succession of stacking compartments arranged one behind the other to which said flat articles are supplied by switches separately associated with the individual compartments, and wherein, on the conveying path, closely before each individual stacking compartment, there is provided a rubber elastic roller-type attachment which forces the upper edge of each flat article against a guide sheet disposed opposite said attachment, and wherein further on the conveying path, closely before each individual stacking compartment and below the roller-type attachment there is disposed a rimmed roller which imparts a stiffening curvature to said flat articles.

2. A device according to claim 1, wherein, on the conveying path, immediately before each individual stacking compartment, there is disposed a stacking spindle comprised of a conical helical body, said stacking spindle transporting each incoming flat article to the stacking compartment in the direction of the ascent of the helix of said conical helical body.

3. A device according to claim 2, wherein the respective end of said stacking spindle at the side of the bottom of said conical helical body supports an associated stack of said flat articles, said flat articles being shaken by the discharge end of said helix.

4. A device according to claim 3, wherein each stacking spindle is positioned so that, during the transport of said flat articles through said stacking spindle, only the lower edge of each article is transported out of the insertion region at the same speed.

5. A device according to claim 2, wherein each stacking spindle is positioned so that, during the transport of said flat articles through said stacking spindle, only the lower edge of each article is transported out of the insertion region at the same speed.

6. A device according to claim 1, wherein, on the conveying path, immediately before each individual stacking compartment, there is disposed a stacking spindle comprised of a conical helical body, said stacking spindle transporting each incoming flat article to the stacking compartment in the direction of the ascent of the helix of said conical helical body.

7. A device according to claim 6, wherein the respective end of said stacking spindle at the side of the bottom of said conical helical body supports an associated stack of said flat articles, said flat articles being shaken by the discharge end of said helix.

8. A device according to claim 6, wherein each stacking spindle is positioned so that, during the transport of said flat articles through said stacking spindle, only the lower edge of each article is transported out of the insertion region at the same speed.

* * * * *